United States Patent Office 3,426,018
Patented Feb. 4, 1969

3,426,018
WATER-SOLUBLE REACTIVE ANTHRAQUINONE
DYESTUFFS, THEIR PREPARATION AND USE
Dennis Eckersley and William Elliot Stephen, Manchester,
England, assignors to Imperial Chemical Industries Limited, London, England, a corporation of Great Britain
No Drawing. Filed Feb. 14, 1966, Ser. No. 527,097
Claims priority, application Great Britain, Feb. 16, 1965,
6,654/65
U.S. Cl. 260—239.7
Int. Cl. C07d 55/20
3 Claims

ABSTRACT OF THE DISCLOSURE

A water-soluble reactive anthraquinone dyestuff of the formula

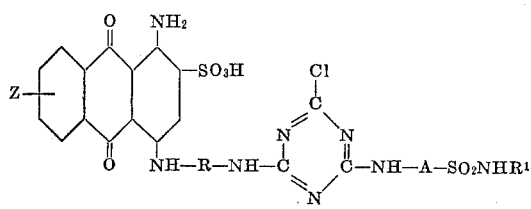

Z can be a hydrogen or sulfonic acid while R is a sulphonphenylene radical or the 4,4'-divalent disulphostilbene radical. X can be N, C—CN or C—Cl while A is a phenylene or phenylene containing a $SO_2NR^1$ substituent. $R^1$ can be β-chloroethyl, β,α-dichloropropyl, β-sulphatoethyl or α-chloro-β-hydroxypropyl.

---

This invention relates to new water-soluble reactive anthraquinone dyestuffs, to the methods of preparation thereof and to the use of such dyestuffs for colouring textile materials.

It is known to use dyestuffs containing halogeno-s-triazine groups for the purpose of colouring fibers containing hydroxyl groups, especially cellulose materials such as cotton and viscose rayon.

These dyestuffs readily fix on such materials with good fastness to wet processing, since the halogeno-s-triazine group is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the halogeno-s-triazine group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unfixed dyestuff. The wastage of dyestuff and extra processing make the dyeing or printing process more expensive especially when deep shades are required.

The present invention is concerned with the production of water-soluble halogeno-s-triazine reactive dyestuffs which have a remarkably high fixation on the fibre and for which washing-off treatments can be reduced considerably.

According to the invention there are provided reactive water-soluble anthraquinone dyestuffs of the formula:

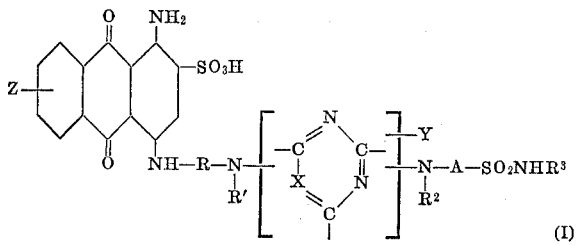

wherein

Z represents H or $SO_3H$;
R represents a divalent benzene, stilbene or diphenyl radical in which the benzene nucleus or nuclei can carry one or more substituents there being at most one $SO_3H$ group for each benzene nucleus;
R' and $R_2$ each independently represents a hydrogen atom or an alkyl group having up to 4 carbon atoms;
Y represents Cl or Br;
X represents N or C—X' in which X' is Cl, Br, or CN;
A represents a phenylene or naphthylene radical in which the nucleus can carry one or more substituents; and
$R^3$ is an ethyl or propyl group having Cl, Br or $OSO_3H$ in the β or γ position to the nitrogen atom, and which may be further substituted.

As examples of substituents which may be present in the nuclei represented by R and A, there may be mentioned $SO_3H$, COOH, $OCH_3$ and Cl, and as examples of substituents which may be present in $R_3$, there may be mentioned Cl and OH.

The new anthraquinone dyestuffs are obtained by condensing a heterocyclic compound of the formula:

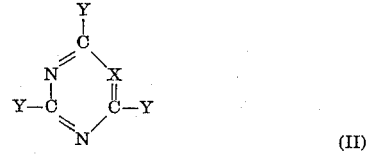

wherein X and Y have the meanings stated above, in either order, with (a) one molecular proportion of an amino-antraquinone compound of the formula:

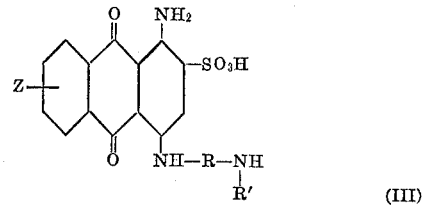

wherein R, R' and Z have the meanings stated above, and
(b) one molecular proportion of an amine of the formula:

$$NHR^2—A—SO_2NHR^3 \qquad (IV)$$

wherein A, $R^2$ and $R^3$ have the meanings stated above.

As examples of compounds of Formula II, there may be mentioned cyanuric chloride, cyanuric bromide, 2,4,5,6-tetrachloro- and terta-bromopyrimidines, and 5-cyano-2,4,6-trichloro- and tribromo-pyrimidines.

As examples of compounds of Formula III there may be mentioned 1 - amino - 4 - (4'-aminoanilino)anthraquinone-2,3'-disulphonic acid, 1-amino-4-(3'-aminoanilino) anthraquinone-2,4'-disulphonic acid, 1-amino-4-(4'-aminoanilino)anthraquinone-2,3',5- and 2,3',8-trisulphonic acids and mixtures of these acids, 1-amino-4-(4''-aminodiphenyl)amino anthraquinone-2,3''-disulphonic acid and 1 - amino - 4 - [4'-ω(4''-aminostyryl)anilino]anthraquinone-2,2'',3'-trisulphonic acid.

As examples of compounds of Formula IV there may be mentioned 4-(β-chloroethylsulphamyl)-aniline, 3(β-chloroethylsulphamyl) - aniline, 3:5 - di(β-chloroethylsulphamyl)aniline, 4-(β-sulphatoethylsulphamyl)-aniline, 3-(β-sulphatoethylsulphamyl)-aniline, 4 - (γ-chloro-β-hydroxypropylsulphamyl)-aniline, 4 - (β,γ-dichloropropylsulphamyl)-aniline, 4-(β-chloropropylsulphamyl)-aniline, 4 - (γ-bromo-β-hydroxypropylsulphamyl) - aniline, 2-methoxy - 5 - (γ-chloro-β-hydroxypropylsulphamyl) - aniline, 6 - (β-chloroethylsulphamyl) - 2 - naphthylamine.

The above process can conveniently be carried out by suspending the heterocyclic compound in water or a mixture of water with a water-miscible organic solvent, adding one of the other two reagents or a solution thereof in water or a water-miscible organic solvent stirring the mixture at a suitable temperature until one chlorine or bromine atom on the heterocyclic compound has been reacted, or substantially so, then adding the third reactant and stirring at a suitable temperature to effect reaction of the second chlorine or bromine atom. In general, a temperature of 0 to 5° C. is suitable for the first step and a temperature of 30 to 50° C. is suitable for the second step. The reaction is preferably carried out in the presence of an acid-binding agent, added at such a rate as to maintain the pH of the reaction mixture between the limits of 4 and 8.

The new dyestuffs can be isolated by any of the usual means used in connection with water-soluble reactive dyestuffs, preferably by the addition of sodium chloride, and filtering off the precipitated dyestuff and drying.

The new dyestuffs can be used for dyeing or printing a wide variety of textile materials. They are particularly valuable for use as reactive dyes for cellulose with which they are capable, in the presence of acid-binding agents, of reacting with a high degree of efficiency.

The invention is illustrated but not limited by the following examples in which parts are by weight:

EXAMPLE 1

A solution of 15.88 parts of the trisodium salt of 1-amino - 4(4'-aminoanilino) - anthraquinone - 2:3':5 - trisulphonic acid in 200 parts of water is added during 20 minutes at 0–5° C. to a stirred suspension of 4.88 parts of cyanuric chloride in 30 parts of acetone and 100 parts of water. The mixture is stirred for a further 20 minutes at 0–5° C. whilst the pH is maintained throughout the reaction at 4–5 by the gradual addition of 2 N sodium carbonate solution. The reaction mixture is then filtered to remove traces of insoluble material the filtrates are stirred at pH 6–6.5 and a solution of 5.9 parts of 4-(β-chloroethylsulphamyl)aniline in 60 parts of acetone is added. The temperature is then raised to 35–40° C., and is maintained for 30 minutes, the temperature is then raised to 40–45° C. and is maintained for 3½ hours. The pH is maintained throughout the heating period at 6–7 by the gradual addition of 2 N sodium carbonate solution. The reaction mixture is then allowed to stir and cool to room temperature and 20 parts of sodium chloride are added and the mixture stirred for 30 minutes. The precipitated dyestuff is filtered, washed on the filter with a solution of 30 parts of sodium chloride in 400 parts of water and is finally dried in vacuo at room temperature. The product is found on analysis to contain 2 atoms of hydrolysable chlorine per molecule of dyestuff and when applied to cellulosic fibres in conjunction with an acid-binding agent yields greenish-blue tints of excellent fastness to washing and light.

EXAMPLE 2

A solution of 13.33 parts of the disodium salt of 1-amino - 4(3'-aminoanilino) - anthraquinone - 2:4' - disulphonic acid in 200 parts of water is added during 20 minutes at 0–5° C. to a stirred suspension of 4.88 parts of cyanuric chloride in 30 parts of acetone and 100 parts of water.

The mixture is stirred for a further 20 minutes at 0–5° C. whilst the pH is maintained throughout the reaction at 4–5 by the gradual addition of 2 N sodium carbonate solution. The reaction mixture is then filtered to remove traces of insoluble material, the filtrates are stirred at pH 6–6.5 and a solution of 5.9 parts of 4-(β-chloroethyl sulphamyl)aniline in 60 parts of acetone is added. The temperature of the reaction mixture is raised to 40–45° C. and is maintained for 4 hours. The pH is maintained throughout the heating period at 6–7 by the gradual addition of 2 N sodium carbonate solution. The reaction mixture is then allowed to stir and cool to room temperature. The precipitated dyestuff is filtered, washed on the filter with a solution of 20 parts of sodium chloride in 400 parts of water and is finally dried in vacuo at room temperature. The product is found on analysis to contain two atoms of hydrolysable chlorine per molecule of dyestuff and when applied to cellulosic fibres in conjunction with an acid-binding agent yields reddish-blue tints of excellent fastness to wet treatments and light.

EXAMPLE 3

A solution of the reaction product of 1-amino-4-(4'-aminoaniline-anthraquinone-2:3':5-trisulphonic acid and cyanuric chloride obtained as described in Example 1 is stirred at pH 6–7 and a solution of 6.39 parts of 4-(β-chloropropylsulphamyl)-aniline in 40 parts of acetone is added. The mixture is heated at 35–40° C. for 5 hours whilst the pH is maintained at 6.5–7.0 by the gradual addition of 2 N sodium carbonate solution. The reaction mixture is stirred and allowed to cool to room temperature, the precipitated dyestuff is filtered, washed on the filter with 300 parts of 5% brine and is finally dried in vacuo at 25° C.

The product is found on analysis to contain 2 atoms of hydrolysable chlorine per molecule of dyestuff and when applied to cellulosic fibres in conjunction with an acid binding agent yields strong greenish-blue tints of excellent fastness to wet treatments and light.

By substitution of 13.3 parts of the disodium salt of 1-amino-4-(3'-aminoanilino)-anthraquinone - 2:4' - disulphonic acid for the 15.88 parts of the trisodium salt of 1-amino-4-(4'-aminoanilino)-2:3':5-trisulponic acid used in the above example, a dyestuff yielding reddish-blue tints of excellent fastness to wet treatments and light is obtained.

EXAMPLE 4

A solution of the reaction product of 1-amino-4-(4'-aminoanilino)anthraquinone-2:3':5-trisulphonic acid and cyanuric chloride obtained as described in Example 1 is stirred at pH 6–7 and a solution of 7.43 parts of 4-(β,γ-dichloropropylsulphamyl)-aniline in 40 parts of acetone is added. The mixture is heated at 35–40° C. for 6 hours whilst the pH is maintained at 6–6.5 by the gradual addition of 2 N sodium carbonate solution. The reaction mixture is allowed to stir and cool to room temperature, the precipitated dyestuff is filtered, washed on the filter with 300 parts of 3.5% brine solution and is finally dried in vacuo at 25° C.

The product is found on analysis to contain 3 atoms of hydrolysable chlorine per molecule of dyestuff and when applied to cellulosic fibres in conjunction with an acid-binding agent yields strong greenish-blue tints of excellent fasteness to wet treatments and light.

EXAMPLE 5

A solution of the reaction product of 1-amino-4-(4'-aminoanilino)anthraquinone-2:3':5-trisulphonic acid and cyanuric chloride obtained as described in Example 1 is stirred at pH 6-7 and a solution of 7.9 parts of 4-(β-sulphatoethylsulphamyl)-aniline in 100 parts of water is added. The mixture is heated at 35-40° C. for 6 hours whilst the pH is maintained at 6-6.5 by the gradual addition of 2 N sodium carbonate solution. The reaction mixture is allowed to stir and cool to room temperature, 60 parts of sodium chloride are added and the mixture is stirred for a further hour. The precipitated dyestuff is filtered, washed on the filter with a solution of 25 parts of sodium chloride in 200 parts of water and is finally dried in vacuo at 25° C.

The product is found on analysis to contain 1 atom of hydrolysable chlorine per molecule of dyestuff and when applied to cellulosic fibres in conjunction with an acid-binding agent yields strong greenish-blue tints of excellent fastness to wet treatments and light.

EXAMPLE 6

By substitution of 9.9 parts of 3:5-di-(β-chloroethylsulphamyl)-aniline for the 5.9 parts of 4-(β-chloroethylsulphamyl)-aniline used in Example 1 a dyestuff which contains on analysis 3.0 atoms of hydrolysable chlorine per molecule of dyestuff, is obtained. When the dyestuff is applied to cellulosic fibres, in conjunction with an acid-binding agent, greenish blue tints of excellent fastness to washing and light are obtained.

EXAMPLE 7

A solution of 12.7 parts of the trisodium salt of 1-amino-4-(4'-aminoanilino) anthraquinone - 2:3':5 - trisulphonic acid in 250 parts of water is added during 20 minutes to a stirred suspension of 4.27 parts of 5-cyano-2:4:6-trichloropyrimidine in 80 parts of dioxan and 50 parts of water at 15° C. The reaction mixture is stirred for a further hour at 15° C. whilst the pH is maintained at 5-6 by the gradual addition of 2 N sodium carbonate solution.

The reaction mixture is then screened to remove traces of insoluble material, the filtrates are stirred and a solution of 5.17 parts of 4-(β-chloroethylsulphamyl)aniline in 50 parts of acetone is added. The temperature of the reaction mixture is raised to 55-60° C. and is maintained at 55-60° C. for 4 hours whilst the pH is maintained at 6-7 by the gradual addition of 2 N sodium carbonate solution. 30 parts of sodium chloride are then added and the mixture is allowed to stir and cool to room temperature. The precipitated dyestuff is filtered, washed on the filter with a solution of 25 parts of sodium chloride in 250 parts of water and is finally dried in vacuo at 20° C. The product is found on analysis to contain 2 atoms of hydrolysable chlorine per molecule of dyestuff and when applied to cellulosic fibres in conjunction with an acid binding agent yields greenish-blue tints of excellent fastness of wet treatments and light.

By substitution in the above example of 14.7 parts of the trisodium salt of 1-amino-4-[4'-ω-(4''-aminostyryl) anilino]-anthraquinone-2,2'',3'-trisulphonic acid for the 12.7 parts of the trisodium salt of 1-amino-4-(4'-aminoanilino)-anthraquinone-2:3':5-trisulphonic acid a dyestuff which contains on analysis 2 atoms of hydrosable chlorine per molecule of dyestuff, is obtained. When applied to cellulosic fibres in conjunction with an acid binding agent, bright green tints of excellent fastness to washing and light are obtained.

EXAMPLE 8

A solution of the reaction product of 1-amino-4-(4'-aminoanilino)-anthraquinone - 2:3':5 - trisulphonic acid and cyanuric chloride obtained as described in Example 1 is stirred at pH 5-7 and a solution of 7.28 parts of 4-(γ-chloro-β-hydroxypropylsulphamyl)-aniline in 45 parts of acetone is added. The mixture is heated at 35-40° C. for 1 hour and then at 40-45° C. for 3 hours whilst the pH is maintained at 6-7 by the gradual addition of 2 N sodium carbonate solution. The reaction mixture is allowed to stir and cool to room temperature, 35 parts of sodium chloride are added and the mixture is stirred for a further hour. The precipitated dyestuff is filtered washed on the filter with a solution of 45 parts of sodium chloride in 300 parts of water and is finally dried in vacuo at 25° C.

The product is found on analysis to contain 2 atoms of hydrolysable chlorine per molecule of dyestuff and when applied to cellulosic fibres in conjunction with an acid binding agent yields strong greenish-blue tints of excellent fastness to wet treatments and light.

EXAMPLE 9

A solution of 25.4 parts of the trisodium salt of 1-amino-4-(4'-aminoanilino)-anthraquinone - 2:3':5 - trisulphonic acid in 300 parts of water and 100 parts of ethyl alcohol is added during 15 minutes to a stirred solution of 9.2 parts of 2:4:5:6-tetrachloropyrimidine in 250 parts of ethyl alcohol at 75-80° C. The reaction mixture is stirred at 75-80° C. for 14 hours, 20 parts of 2 N sodium carbonate solution are added to neutralise the developed acidity and the mixture stirred for 5 minutes. A solution of 150 parts of sodium chloride in 500 parts of water is added, the solution is stirred and allowed to cool to room temperature. The precipitated dyestuff is filtered washed on the filter with a solution of 60 parts of sodium chloride in 600 parts of water and is finally sucked dry.

The filter cake is dissolved in 500 parts of water, the solution is stirred and a solution of 11.3 parts of 4-(β-chloroethylsulphamyl)aniline in 100 parts of dioxan is added and the mixture is stirred at 90-95° C. for 18 hours. The mixture is neutralised by the addition of 20 parts of 2 N sodium carbonate solution, 50 parts of sodium chloride is added an the mixture is stirred and allowed to cool to 20° C.

The precipitated dyestuff is filtered, washed on the filter with a solution of 30 parts of sodium chloride in 300 parts of water and is finally dried in vacuo.

The product is found on analysis to contain 3 Cl atoms per molecule of dyestuff and when applied to cellulosic textile fibres in conjunction with an acid binding agent yields strong greenish blue tints fast to light and wet treatments.

We claim:
1. Water-soluble anthraquinone dyestuff of the formula:

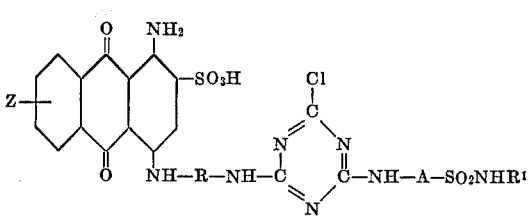

wherein Z is hydrogen or sulphonic acid;

R is selected from sulphophenylene radical and the 4.4'-divalent disulphostilbene radical A is selected from phenylene and phenylene containing a $SO_2NR^1$ substituent $R^1$ is selected from β-chloroethyl, β,γ-dichloropropyl, β-sulphatoethyl and γ-chloro-β-hydroxypropyl.

2. The water-soluble anthaquinone dyestuff as claimed in claim 1, having the formula:
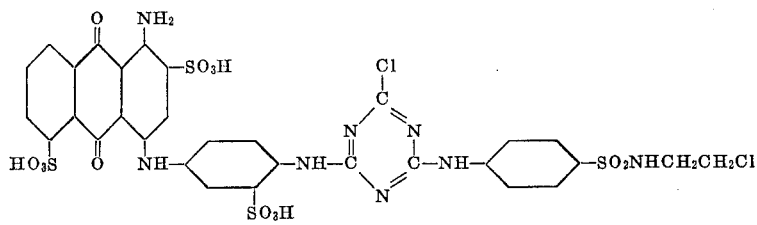
3. The water-soluble anthraquinone dyestuff as claimed in claim 1, having the formula:
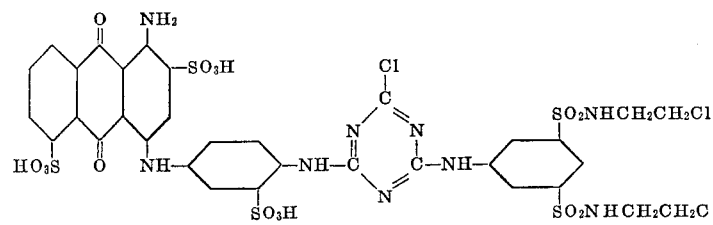
References Cited
UNITED STATES PATENTS
3,133,921  5/1964  Brassel et al. _____ 260—249
3,341,539  9/1967  Staeuble et al. _____ 260—249
FOREIGN PATENTS
981,041  1/1965  Great Britain.
HENRY R. JILES, *Primary Examiner.*
HARRY I. MOATZ, *Assistant Examiner.*
U.S. Cl. X.R.
8—40; 260—374, 397.7, 556